(12) United States Patent
Iida et al.

(10) Patent No.: US 6,741,427 B2
(45) Date of Patent: May 25, 2004

(54) MAGNETIC DISK DRIVE HAVING ARM DISPLACEMENT LIMIT MECHANISM FOR SHOCK RESISTANCE

(75) Inventors: Akira Iida, Odawara (JP); Masaaki Matsumoto, Odawara (JP); Shinsuke Higuchi, Odawara (JP)

(73) Assignee: Hitachi Global Storage Technologies Japan, Ltd., Kanagawa-ken (JP)

(*) Notice: Subject to any disclaimer, the term of this patent is extended or adjusted under 35 U.S.C. 154(b) by 0 days.

(21) Appl. No.: 10/058,942

(22) Filed: Jan. 30, 2002

(65) Prior Publication Data

US 2002/0071220 A1 Jun. 13, 2002

Related U.S. Application Data

(63) Continuation of application No. 09/725,106, filed on Nov. 29, 2000, which is a continuation of application No. 09/185,075, filed on Nov. 3, 1998, now abandoned.

(30) Foreign Application Priority Data

Nov. 6, 1997 (JP) .............................. 9-304053

(51) Int. Cl.$^7$ ................................ G11B 5/54
(52) U.S. Cl. .................... 360/254.7; 360/255
(58) Field of Search .................. 360/254.7, 254.8, 360/254.9, 255, 255.6, 255.7, 255.8, 255.9, 245.7

(56) References Cited

U.S. PATENT DOCUMENTS

| | | | |
|---|---|---|---|
| 4,661,873 A | | 4/1987 | Schulze |
| 4,724,500 A | * | 2/1988 | Dalziel .................... 360/245.7 |
| 4,939,611 A | | 7/1990 | Connolly |
| 5,208,712 A | | 5/1993 | Hatch et al. |
| 5,239,431 A | | 8/1993 | Day et al. |
| 5,296,985 A | | 3/1994 | Mochizuki et al. |
| 5,526,206 A | | 6/1996 | Shimizu |
| 5,590,095 A | | 12/1996 | Chaya |
| 5,640,290 A | | 6/1997 | Khanna et al. |
| 5,701,219 A | | 12/1997 | Shafe |
| 5,731,933 A | | 3/1998 | Sonderegger et al. |
| 5,757,587 A | | 5/1998 | Berg et al. |
| 5,825,576 A | * | 10/1998 | Kamerbeek .................... 360/75 |
| 5,926,347 A | * | 7/1999 | Kouhei et al. ............ 360/254.3 |
| 6,028,745 A | * | 2/2000 | Nguyen et al. ........... 360/254.3 |
| 6,046,883 A | * | 4/2000 | Miller ...................... 360/245.7 |
| 6,055,134 A | * | 4/2000 | Boutaghou ............... 360/254.4 |
| 6,067,209 A | * | 5/2000 | Aoyagi et al. ........... 360/254.7 |
| 6,078,474 A | * | 6/2000 | Koyanagi et al. ......... 360/254.8 |
| 6,115,214 A | * | 9/2000 | Allsup et al. ............. 360/254.3 |
| 6,172,843 B1 | * | 1/2001 | Genheimer et al. ....... 360/245.7 |
| 6,373,666 B2 | * | 4/2002 | Iida et al. ................. 360/254.7 |
| 2001/0033459 A1 | * | 10/2001 | Boutaghou ............... 360/254.3 |

FOREIGN PATENT DOCUMENTS

| | | |
|---|---|---|
| EP | 365151 | 4/1990 |
| JP | 3-168985 | 7/1991 |
| JP | 6-60579 | 3/1994 |
| JP | 6-119733 | 4/1994 |

* cited by examiner

Primary Examiner—Brian E. Miller
(74) Attorney, Agent, or Firm—Mattingly, Stanger & Malur P.C.

(57) ABSTRACT

A magnetic disk drive includes a magnetic head slider, a magnetic head slider support mechanism for supporting the magnetic head slider and moving it to a predetermined position, and a load/unload mechanism for detaching the magnetic head slider from the surface of a magnetic disk or moving it thereto. When the magnetic head slider is detached from the magnetic disk surface for unloading, the magnetic head slider support mechanism is restrained against displacement in at least one direction perpendicular to the magnetic disk surface by a restraining part which is provided at a position, on other than the load/unload mechanism, between the magnetic head slider and a pivot of the magnetic head slider support mechanism.

13 Claims, 7 Drawing Sheets

MAGNETIC DISK DRIVE HAVING ARM DISPLACEMENT LIMIT MECHANISM FOR SHOCK RESISTANCE

This is a continuation application of U.S. Ser. No. 09/725,106, filed Nov. 29, 2000 which is a continuation application of U.S. Ser. No. 09/185,075, filed Nov. 3, 1998, now abandoned.

BACKGROUND OF THE INVENTION

The present invention relates to a magnetic disk drive used as an external storage of a computer system or the like and, more particularly, to a magnetic disk drive having an arm displacement limit mechanism for shock resistance.

A conventional magnetic disk drive adopts a contact start-stop (CSS) method in which a magnetic head slider comes into contact with a magnetic disk when disk drive operation is stopped and the magnetic head slider floats on a layer of air current produced by rotation of the magnetic disk when disk drive operation is started for writing or reading information on the magnetic disk. This method, however, gives rise to such a problem that adherence may occur between the magnetic head slider and the magnetic disk or the surface of the magnetic disk may be damaged when an impact is applied to it by the magnetic head slider. To circumvent these disadvantages, it has been proposed to provide a load/unload mechanism which mechanically brings the magnetic head slider out of contact with the magnetic disk.

In Japanese Unexamined Patent Publication No. 60579/1994, there is disclosed a load/unload method in which a support spring is shifted over a slant surface upward for loading/unloading operation. Another load/unload method in which the magnetic head slider is moved to a turnout position for loading/unloading operation is found in Japanese Unexamined patent application Ser. No. 119733/1994.

In a small-sized magnetic disk drive contained in a recent portable computer, it is required to provide higher impact resistance than ever before. However, a magnetic head slider support mechanism is designed to have a thinner structure for implementing a slimmer magnetic disk drive or increasing the number of mounted magnetic disks.

In the conventional art, although a load/unload arm support member restrains the vicinity of the magnetic head slider against at least displacement in a direction of approaching the magnetic disk, free displacement in a direction perpendicular to the magnetic disk surface may occur on other parts. Therefore, if the magnetic disk drive receives an intense impact, the magnetic head slider support mechanism undergoes significant displacement, which may cause deformation of the support spring or damage to the magnetic disk due to impacting contact between the magnetic head slider support mechanism and the magnetic disk.

SUMMARY OF THE INVENTION

It is therefore an object of the present invention to provide a magnetic disk drive in which impact resistance thereof is enhanced by suppressing significant displacement of a magnetic head slider mechanism due to an impact to be applied when a magnetic head slider is detached from the surface of a magnetic disk at the time of unloading.

In accomplishing this object of the present invention and according to one aspect thereof, there is provided a magnetic disk drive which comprises a load/unload mechanism for detaching a magnetic head slider from the surface of a magnetic disk, wherein a magnetic head slider support mechanism is restrained by a restraining part against displacement in a direction perpendicular to the magnetic disk surface when the magnetic head slider is unloaded.

According to another aspect of the present invention, there is provided a magnetic disk drive which comprises a load/unload mechanism for detaching a magnetic head slider from the surface of a magnetic disk, wherein a magnetic head slider support mechanism is restrained by a restraining part against displacement in a direction perpendicular to the magnetic disk surface when the magnetic head slider is unloaded, and wherein the restraining part is kept out of contact with the magnetic head slider support mechanism while no impact is applied to the magnetic disk drive.

According to another aspect of the present invention, there is provided a magnetic disk drive which comprises a load/unload mechanism for detaching a magnetic head slider from the surface of a magnetic disk, wherein a guide or actuator arm is restrained by a restraining part against displacement in a direction perpendicular to the magnetic disk surface when the magnetic head slider is unloaded.

According to other aspect of the present invention, there is provided a magnetic disk drive which comprises a load/unload mechanism for detaching a magnetic head slider from the surface of a magnetic disk, wherein a guide or actuator arm is restrained against displacement in direction perpendicular to the magnetic disk surface by a restraining part in a space narrower than that between the magnetic disk surface and the guide arm facing the magnetic disk surface when the magnetic head slider is unloaded.

According to another aspect of the present invent ion, there is provided a magnetic disk drive which comprises a load/unload mechanism for detaching a magnetic head slider from the surface of a magnetic disk, wherein a guide or actuator arm is restrained by a restraining part against displacement in a direction perpendicular to the magnetic disk surface when the magnetic head slider is detached from the magnetic disk surface for unloading, and wherein the restraining part is kept out of contact with the guide arm while no impact is applied to the magnetic disk drive.

The above and other objects, features and advantages of the present invention will become more apparent from the following description of embodiments with reference to the accompanying drawings.

DETAILED DESCRIPTION OF THE PREFERRED EMBODIMENTS

The present invention will now be described in detail by way of example with reference to the accompanying drawings.

Figure 1:
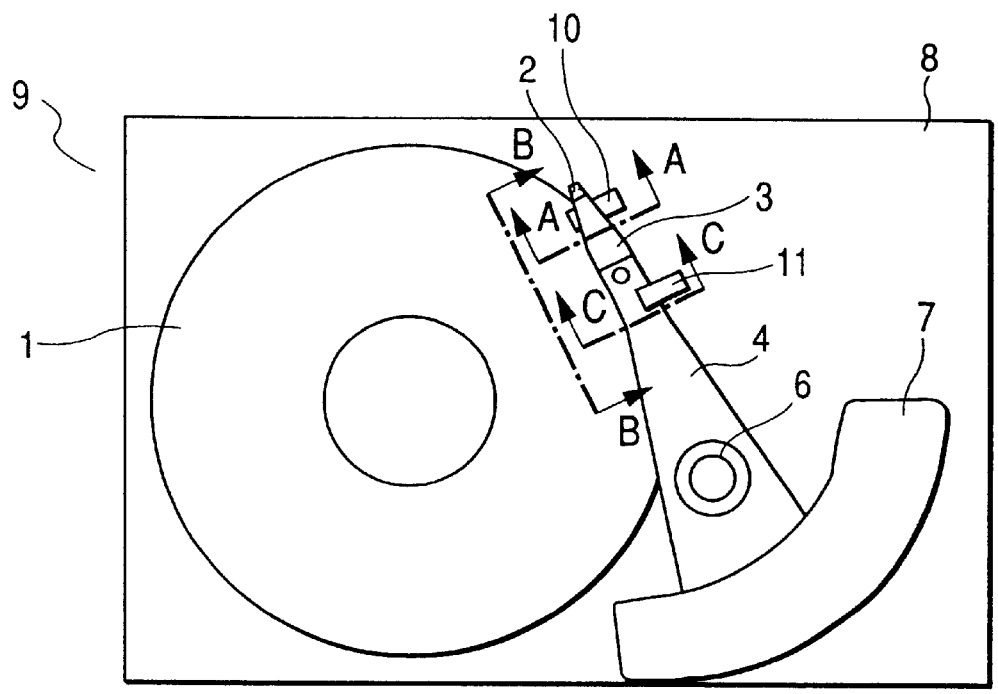
FIG. 1. is a schematic plan view showing a magnetic disk drive in a preferred embodiment of the present invention.
Figure 2:
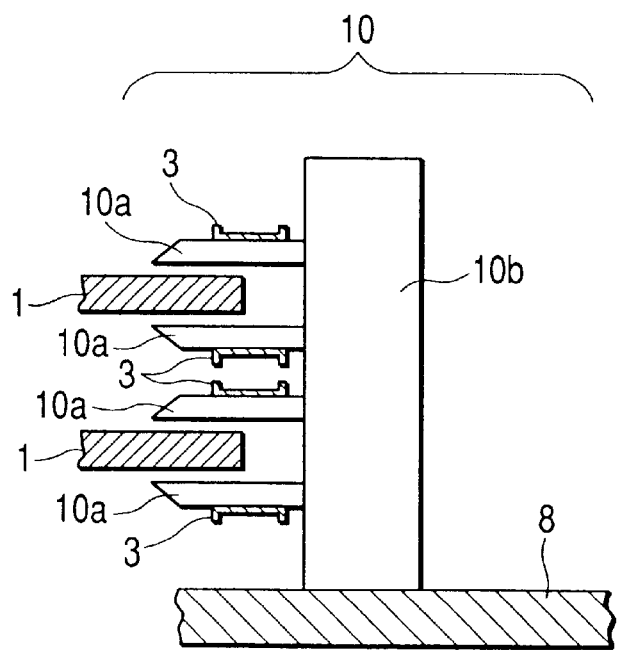
FIG. 2 is a cross-sectional view taken along line A—A in FIG. 1, showing an unload state of the magnetic disk drive.

In FIG. 1, there is shown a schematic diagram indicating a preferred embodiment of a magnetic disk drive 9 of the present invention in a magnetic head slider unload state, and in FIG. 2, there is shown an enlarged cross-sectional view of a load/unload part 10, taken along line A—A for illustrating the unload state. Referring to FIG. 1, a magnetic head slider 2 is mounted on a guide or actuator arm 4 via a support spring or load beam 3, and the guide arm 4 is driven for turning around a pivot 6 by a voice coil motor 7, thus moving the magnetic head slider 2 to a predetermined position above the surface of a magnetic disk 1. The support spring 3 and the guide arm 4 are arranged to form a magnetic head slider support mechanism. The magnetic head slider support mechanism, the pivot 6 and the voice coil motor 7 are structured to from a head access mechanism 5. At a peripheral position of the magnetic disk 1, the load/unload part 10 is disposed for loading/unloading the magnetic head slider 2.

Figure 3:
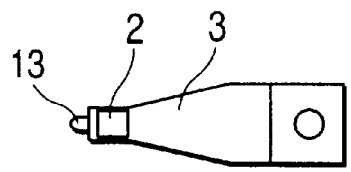
FIG. 3 is a schematic view of a tabbed support spring.

Referring to FIG. 2, the load/unload part 10 comprises a load/unload arm 10a having a slant surface end on the side of the magnetic disk 1 and a load/unload arm support member 10b for supporting the load/unload arm 10a. The magnetic head slider 2 is unloaded in the following manner of operation: First, the magnetic head slider 2 is moved toward the periphery of the magnetic disk 1 by the head access mechanism 5. Then, when it is further moved to the outer circular side of the magnetic disk 1, the support spring 3 is shifted onto the slant surface end of the load/unload arm 10a, i.e., the support spring 3 is raised over the slant surface end of the load/unload arm 10a. The length and angle of the slant surface end of the load/unload arm 10a are arranged so that the magnetic head slider 2 is detached from the surface of the magnetic disk 1 before it comes off the magnetic disk 1. Therefore, when the support spring 3 is shifted beyond the slant surface end of the load/unload arm 10a and halted at a stop position on a flat surface part thereof, the magnetic head slider 2 is positioned apart from the surface of the magnetic disk 1 to complete an unloading operation. In a loading operation of the magnetic head slider 2, the magnetic head slider 2 is moved from the stop position toward the inner circular side of the magnetic disk 1. Through a reverse sequence of the unloading operation mentioned above, the magnetic head slider 2 is loaded. It is to be understood that the magnetic head slider 2 may be detached from the magnetic disk 1 in any method other than that shown in FIG. 2. For instance, instead of the support spring 3 which is shifted over the slant surface end of the load/unload arm 10a, a tab 13 may be formed at the end of the magnetic head slider support mechanism as shown in FIG. 3 so that it will be shifted over the slant surface end of the load/unload arm 10a for loading/unloading operation. There may also be provided an loading/unloading arrangement which includes a part of the end of the magnetic head slider support mechanism or a mechanism for restraining the magnetic head slider 2 against displacement in a direction perpendicular to the surface of the magnetic disk 1.

Figure 4:
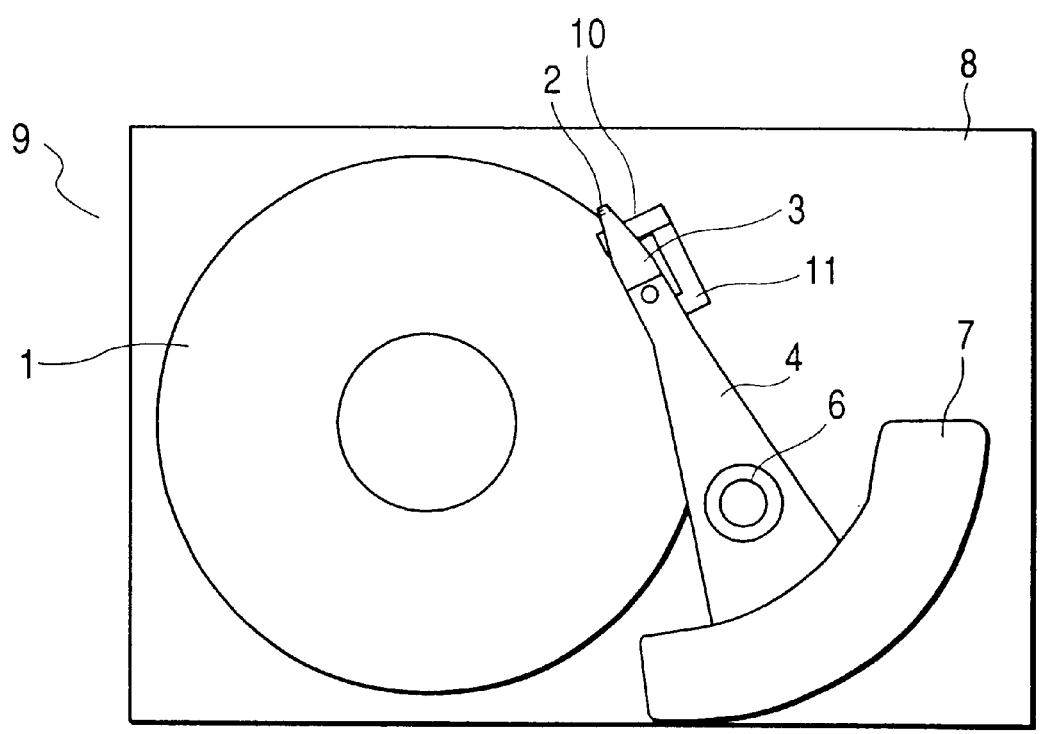
FIG. 4 is a schematic plan view showing a magnetic disk drive in another preferred embodiment of the present invention.

In the unload state in which the magnetic head slider 2 is detached from the magnetic disk 1, the guide arm 4 is restrained or held by a restraining part 11 in the vicinity of the support spring 3 against displacement in the direction perpendicular to the magnetic disk surface as shown in FIG. 1. It is generally advantageous to restrain a region which may undergo significant displacement due to an impact. On the magnetic head slider support mechanism, a part in the vicinity of the magnetic head slider 2 is restrained by the load/unload arm 10a against displacement, and a part in the vicinity of the pivot 6 is restrained by the pivot 6 against displacement. Therefore, for preventing displacement effectively, a region between these parts on the magnetic head slider support mechanism is to be restrained. For instance, when an impact is applied, the support spring 3 may be pulled forcedly toward the guide arm 4 to cause displacement. In this case, a part of the support spring 3 in the vicinity of the guide arm 4 undergoes the largest degree of displacement. Since the strength of the support spring 3 is lower than that of the guide arm 4, the guide arm 4 is to be restrained in the vicinity of the support spring 3 subjected to the largest degree of displacement as in the present preferred embodiment. Although the restraining part 11 is secured to a base 8 in the arrangement shown in FIGS. 1 and 2, there may also be provided such an arrangement that the restraining part is mounted on the load/unload part 10 as shown in FIG. 4 or it is formed integrally with the load/unload part 10. Further, on the magnetic head slider support mechanism except the guide arm 4, a plurality of points may be restrained by the restraining part 11.

Figure 5:
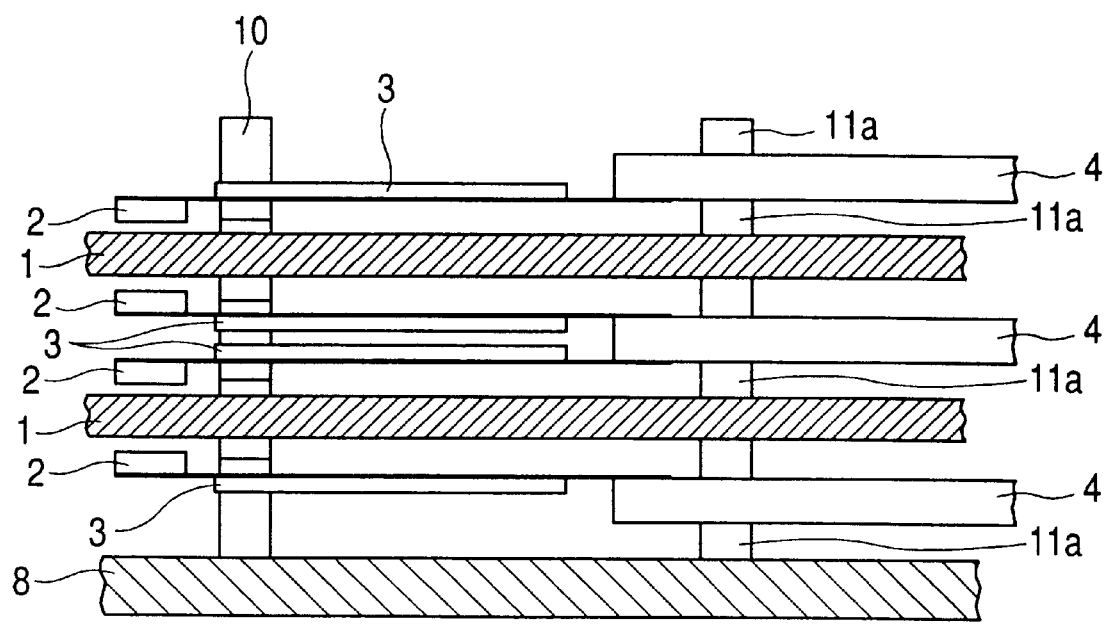
FIG. 5 is a cross-sectional view taken along line B—B in FIG. 1, showing an unload state of the magnetic disk drive.
Figure 6:
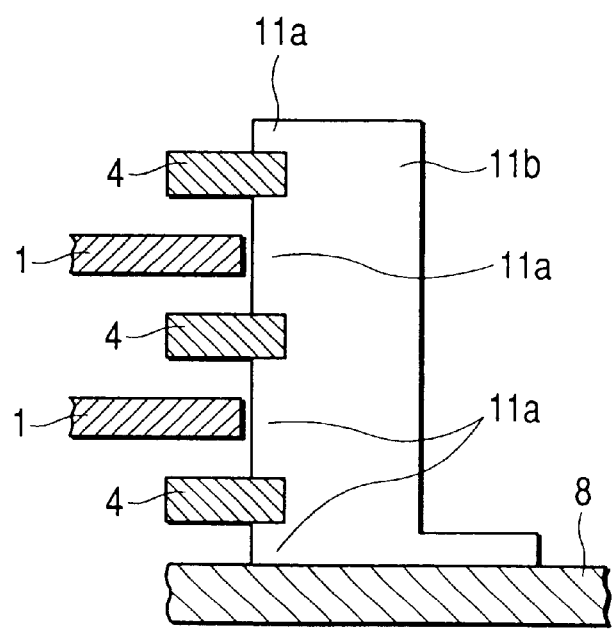
FIG. 6 is a cross-sectional view taken along line C—C in FIG. 1, showing an unload state of the magnetic disk drive.

FIG. 5 shows an enlarged cross-sectional view taken along line B—B in FIG. 1, and FIG. 6 shows an enlarged cross-sectional view taken along line C—C in FIG. 1. The following describes the restraining part 11 in further detail. In FIGS. 5 and 6, the magnetic head slider 2 is unloaded by the load/unload part 10. The restraining part 11 comprises a restraining arm support member 11b secured to the base 8 and a restraining arm 11a extended out of the restraining arm support member 11b toward the magnetic disk 1. Although the restraining arm 11a is extended out of the restraining arm support member 11b toward the magnetic disk 1, the restraining arm 11a is located so that interference with the periphery of the magnetic disk 1 will not occur. There is also provided a disposition in which the vicinity of the mounting part of the support spring 3 will be caught on a part of the guide arm 4 extended outside the magnetic disk 1 at the time of unloading. For implementing the exemplary embodiment shown in FIGS. 5 and 6, it is required to use a considerably high level of metal working precision and assembling accuracy. Still more, since the guide arm 4 comes into contact with the restraining arm 11a, abrasion powder may be produced in loading/unloading operation to cause degradation in reliability of the magnetic disk drive. To circumvent this, there may be provided such an arrangement shown in FIGS. 7 and 8. In this arrangement, the guide arm 4 does not come into contact with the restraining arm 11a at the time of loading/unloading unlike that shown in FIGS. 5 and 6, and a maximum space between the restraining arm 11a and the guide arm 4 is narrower than a space between the guide arm 4 and the magnetic disk 1. The space between the restraining arm 11a and the guide arm 4 is preferably reduced to an extent that the guide arm does not come into contact with the restraining arm 11a in loading/unloading operation.

Accordingly, it is possible to carry out the present invention without having to use a high level of metal working precision and assembling accuracy.

Figure 7:
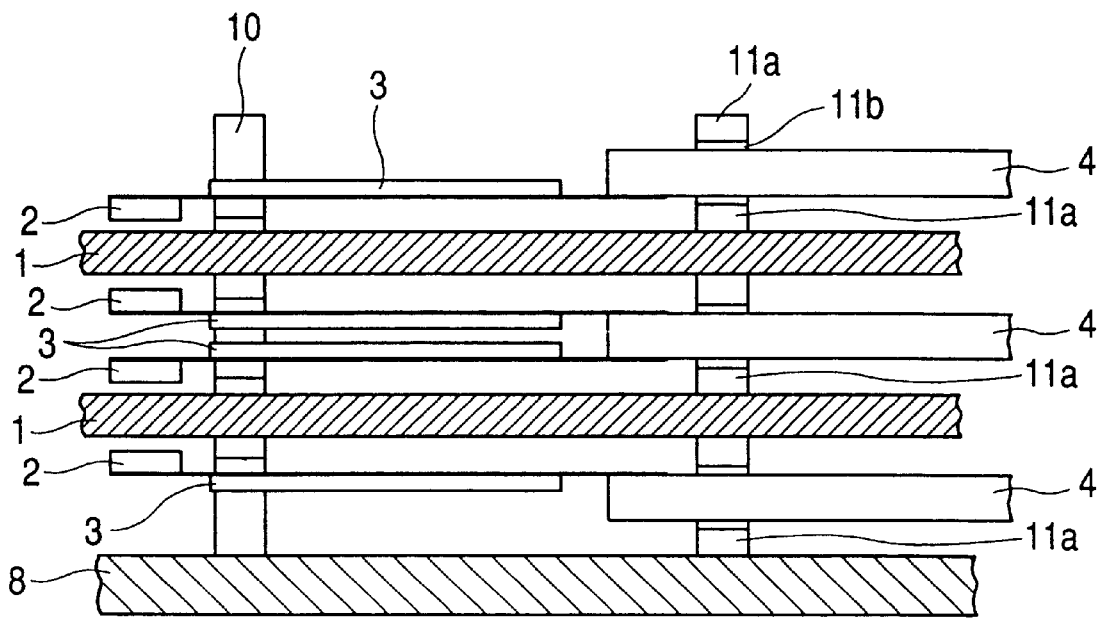
FIG. 7 is a cross-sectional view taken along line A—A in FIG. 1, showing another preferred embodiment of a magnetic disk drive according to the present invention.
Figure 8:
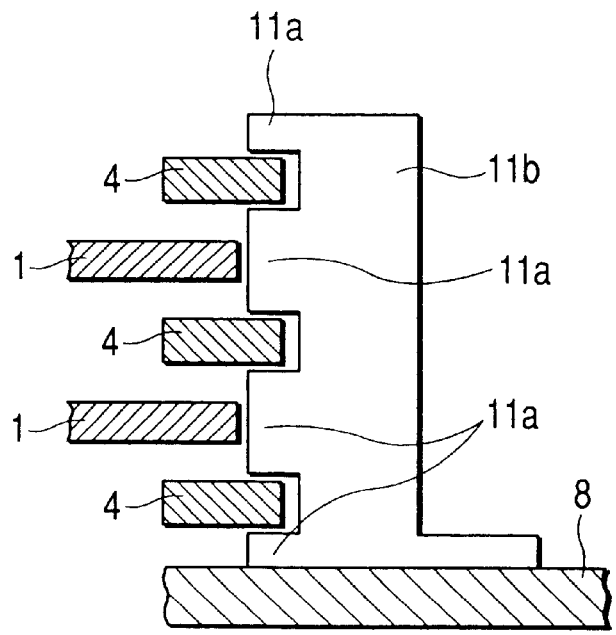
FIG. 8 is a cross-sectional view taken along line B—B in FIG. 1, showing another preferred embodiment of a magnetic disk drive according to the present invention.
Figure 9:
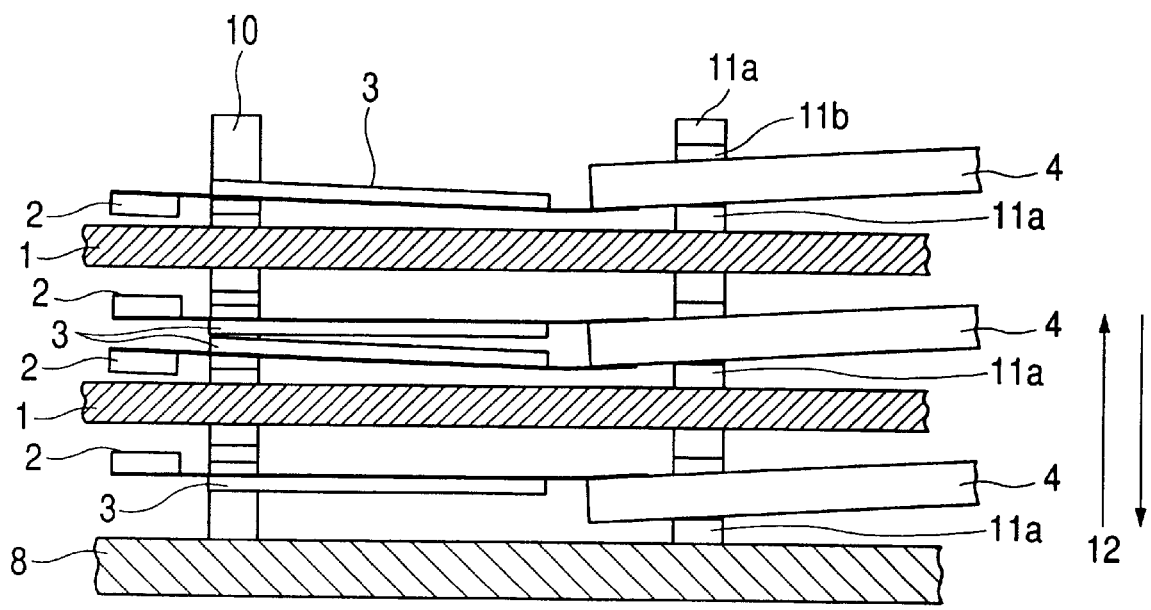
FIG. 9 is an explanatory diagram of operations of a magnetic disk drive in the preferred embodiment shown in FIGS. 8 and 9.
Figure 10:
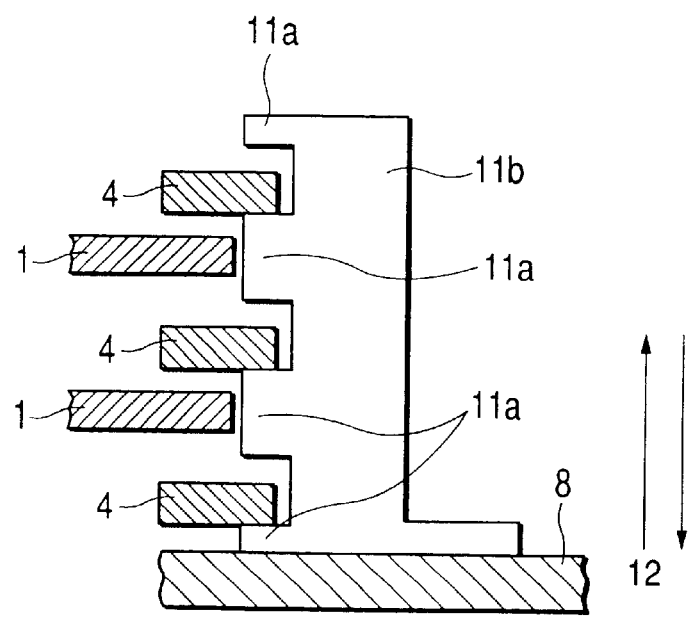
FIG. 10 is an explanatory diagram of operations of a magnetic disk drive in the preferred embodiment shown in FIGS. 8 and 9.

Referring to FIGS. 9 and 10, there are shown conditions that impact force 12 is applied in the unload state indicated in FIGS. 7 and 8. As illustrated in FIGS. 9 and 10, when impact force 12 is applied in the arrow direction, the vicinity of the mounting part of the support spring 3 on the guide arm 4 is brought nearest the magnetic disk 1 since the magnetic head slider 2 and the support spring 3 in the vicinity thereof are restrained by the load/unload part 10 against displacement in an approaching direction perpendicular to the surface of the magnetic disk 1. However, since the space between the restraining arm 11a and the guide arm 4 is narrower than that between the guide arm 4 and the magnetic disk 1, the guide arm 4 comes into contact with the restraining arm 11a before the support spring 3 and the guide arm 4 are brought into contact with the magnetic disk 1. Accordingly, displacement due to contact between the support spring 3/guide arm 4 and the magnetic disk 1 will not take place, thereby preventing damage to the magnetic disk 1 which may be caused by contact between the support spring 3/guide arm 4 and the magnetic disk 1. Further, since displacement of the guide arm 4 is decreased, significant displacement or plastic deformation of the support spring 3 can be prevented to preclude variation in pressing load to be exerted on the magnetic head slider 2 by the support spring 3 during operation of the magnetic disk drive.

Figure 11:
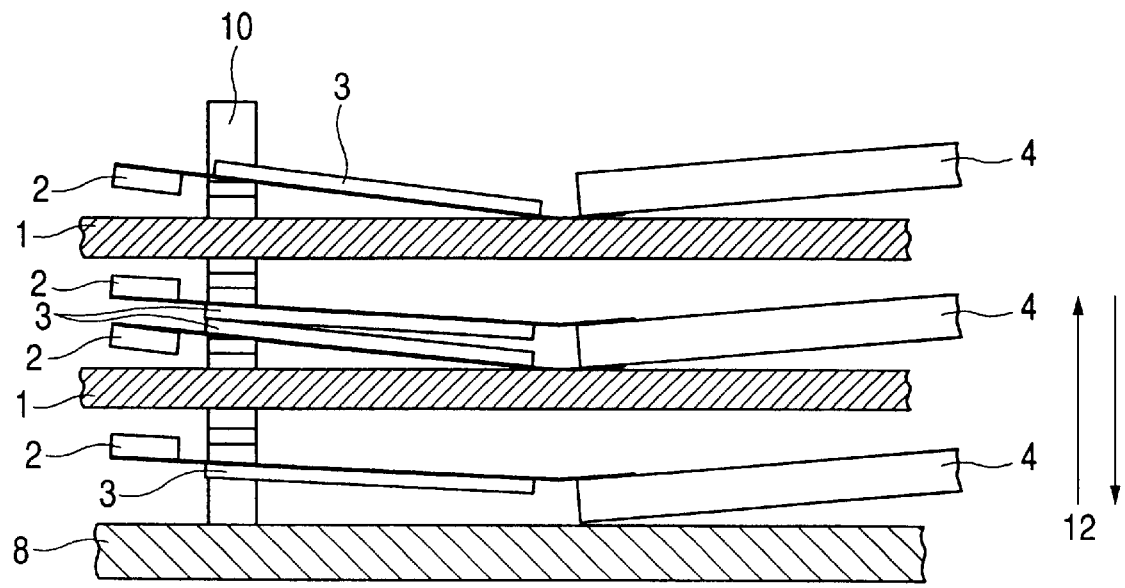
FIG. 11 is an explanatory diagram of operations of a conventional magnetic disk drive.
Figure 12:
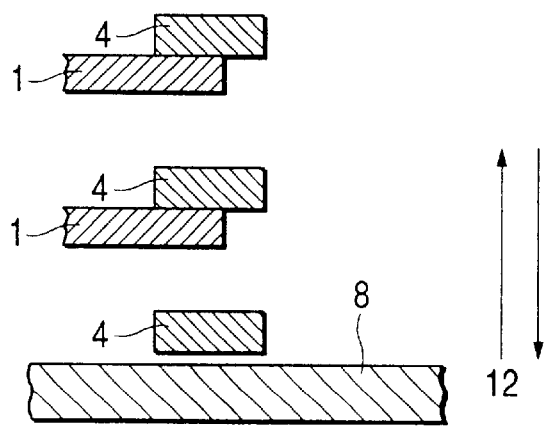
FIG. 12 is an explanatory diagram of operations of the conventional magnetic disk drive.

Referring to FIGS. 11 and 12, there are shown conditions in a conventional arrangement in which the restraining part 11 for restraining the guide arm 4 is not provided. As illustrated in FIGS. 11 and 12, when impact force 12 is applied to cause displacement of the magnetic head slider support mechanism, the support spring 3 and the guide arm 4 are brought into contact with the magnetic disk 1 in a disadvantageous fashion although contact between the magnetic disk 1 and the magnetic head slider support mechanism does not occur in the vicinity of the load/unload part 10. This may result in the magnetic disk 1 and the magnetic head slider support mechanism being damaged.

Figure 13:
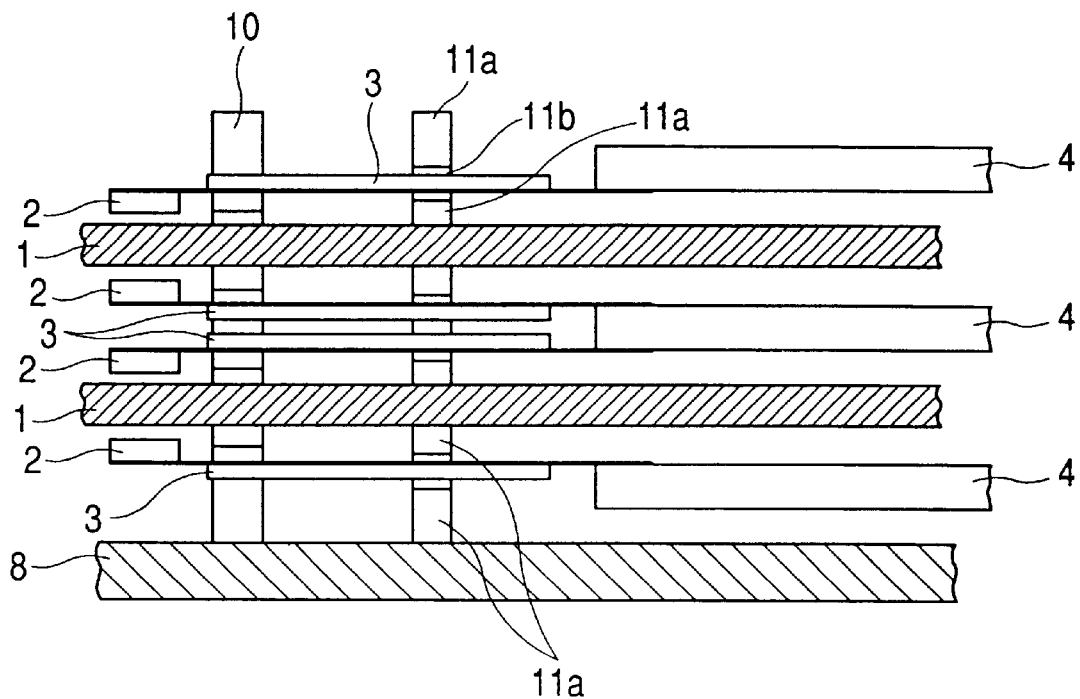
FIG. 13 is a cross-sectional view taken along line B—B in FIG. 1, showing another preferred embodiment of a magnetic disk drive according to the present invention.

Referring to FIG. 13, there is shown another-preferred embodiment in which the strength of the guide arm 4 is higher than that in the embodiment presented in FIG. 7. When impact force is applied, the support spring 3 undergoes displacement so that the guide arm 4 will be-pulled. In this embodiment, the restraining part 11 is preferably provided on the support spring 3.

Figure 14:
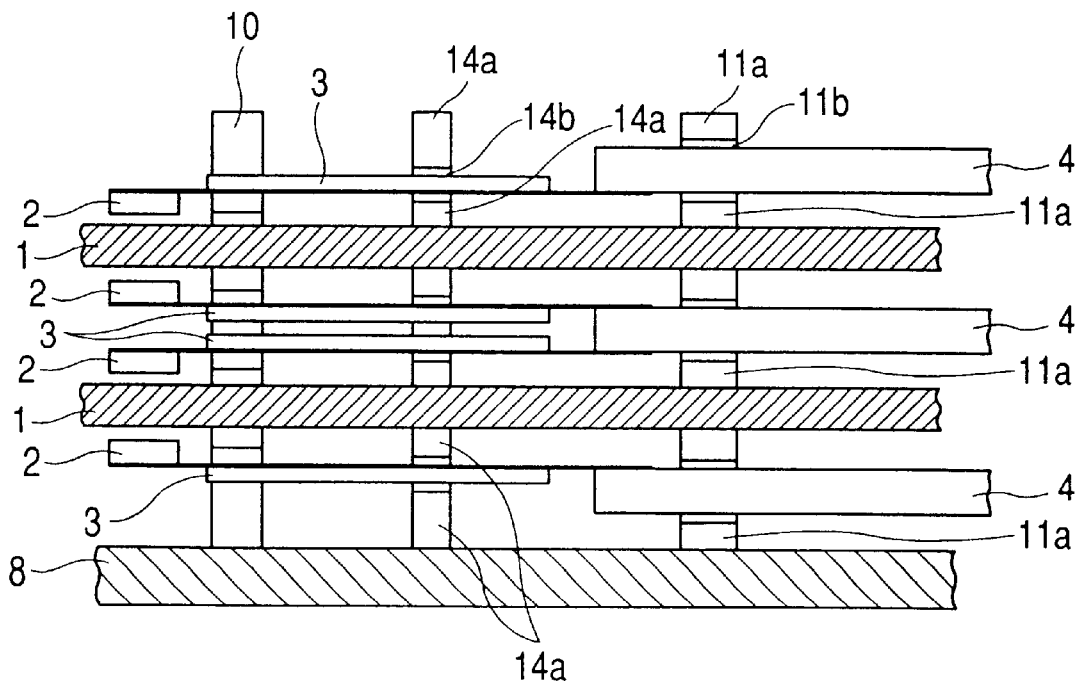
FIG. 14 is a cross-sectional view taken along line B—B in FIG. 1, showing another preferred embodiment of a magnetic disk drive according to the present invention.

Referring to FIG. 14, there if shown another preferred embodiment in which a restraining part 14 comprising a restraining arm 14a and a restraining arm support member 14b is provided to restrain the support spring 3 against displacement in addition to the restraining part 11 for restraining the guide arm 4 against displacement as shown in FIG. 7. In this embodiment, displacement of the magnetic head slider support mechanism can be reduced more effectively than in the arrangement in which only the guide arm 4 is restrained. In particular, where the tab 13 shown in FIG. 3 is formed for use in loading/unloading operation, a distance between the load/unload part 10 and the restraining part 11 for restraining the guide arm 4 becomes longer to increase a degree of possible displacement of the magnetic head slider support mechanism. It is therefore advantageous to provide the restraining part 14 for restraining the support spring 3. In a load/unload method in which the end of the magnetic head slider support mechanism and the magnetic head slider 2 are restrained against displacement in a direction perpendicular to the surface of the magnetic disk 4, provision of this restraining part is also advantageous since displacement of the intermediate part of the magnetic head slider support mechanism tends to increase on occurrence of an impact.

In regard to the preferred embodiment mentioned above, it will be obvious to those skilled in the art that the magnetic head slider support mechanism may also be restrained against displacement in a direction of moving apart from the magnetic disk.

As set forth hereinabove, the present invention makes it possible to enhance impact resistance of a magnetic disk drive during non-operation for improvement in reliability thereof.

The invention may be embodied in other specific forms without departing from the spirit or essential characteristics thereof. The present embodiments are therefore to be considered in all respects as illustrative and not restrictive, the scope of the invention being indicated by the appended claims rather by the foregoing description and all changes which come within the meaning and range of equivalency of the claims are therefore intended to be embraced therein.

What is claimed is:

1. A magnetic disk drive comprising:
   a magnetic head slider;
   a load beam for supporting said magnetic head slider;
   an actuator arm for mounting said load beam and moving said magnetic head slider via said load beam to the surface of a magnetic disk;
   a load/unload mechanism for detaching said magnetic head slider from the surface of said magnetic disk or moving said magnetic head slider thereto;
   a restraining part which catches and restrains displacement of said actuator arm in a vertical direction to said magnetic disk when said magnetic head slider is unloaded; and
   wherein a gap between said actuator arm and said restraining part is narrower than a gap between said actuator arm and said magnetic disk.

2. A magnetic disk drive according to claim 1, wherein said restraining part is out of contact with said actuator arm when no impact is applied to said magnetic disk drive.

3. A magnetic disk drive according to claim 1, wherein said restraining part only contacts said actuator arm when impact is applied to said magnetic disk drive.

4. A magnetic disk drive according to claim 1, wherein said restraining part restrains only displacement of said actuator arm in a direction towards said magnetic disk.

5. A magnetic disk drive comprising:
   a magnetic head slider;
   a load beam for supporting said magnetic head slider;
   an actuator arm for mounting said load beam and moving said magnetic head slider via said load beam to the surface of a magnetic disk;
   a load/unload mechanism for detaching said magnetic head slider from the surface of said magnetic disk or moving said magnetic head slider thereto;
   a restraining part which catches and restrains displacement of said load beam in a vertical direction to said magnetic disk when said magnetic head slider is unloaded; and wherein a gap between said load beam and said restraining part is narrower than a gap between said load beam and said magnetic disk.

6. A magnetic disk drive according to claim 5, wherein said restraining part is out of contact with said load beam when no impact is applied to said magnetic disk drive.

7. A magnetic disk drive according to claim 5, wherein said restraining part only contacts said load beam when impact is applied to said magnetic disk drive.

8. A magnetic disk drive according to claim 5, wherein said restraining part restrains only displacement of said load beam in a direction towards said magnetic disk.

9. A magnetic disk drive comprising:

a magnetic head slider;

a load beam for supporting said magnetic head slider;

an actuator arm for mounting said load beam and moving said magnetic head slider via said load beam to the surface of a magnetic disk;

a load/unload mechanism for detaching said magnetic head slider from the surface of said magnetic disk or moving said magnetic head slider thereto;

a first restraining part which catches and restrains displacement of said actuator arm in a vertical direction to said magnetic disk and a second restraining part which catches and restrains displacement of said load beam in a vertical direction to said magnetic disk when said magnetic head slider is unloaded; and wherein a gap between said actuator arm and said first restraining part is narrower than a gap between said actuator arm and said magnetic disk.

10. A magnetic disk drive according to claim 9, wherein a gap between said load beam and said second restraining part is narrower than a gap between said load beam and said magnetic disk.

11. A magnetic disk drive according to claim 9, wherein said first restraining part is out of contact with said actuator arm and said second restraining part is out of contact with said load beam, respectively, when no impact is applied to said magnetic disk drive.

12. A magnetic disk drive according to claim 9, wherein said first restraining part only contacts said actuator arm and/or said second restraining part only contacts said load beam when impact is applied to said magnetic disk drive.

13. A magnetic disk drive according to claim 9, wherein said first restraining part restrains only displacement of said actuator arm and said second restraining part restrains only displacement of said load beam, respectively, in a direction towards said magnetic disk.

* * * * *